United States Patent [19]

Cretin et al.

[11] Patent Number: 4,901,289
[45] Date of Patent: Feb. 13, 1990

[54] SYSTEM FOR ACQUIRING AND RECORDING SIGNALS DELIVERED BY A SET OF SENSORS DISPOSED IN WELL PROBES

[75] Inventors: Jacques Cretin, Le Chesnay; Jean-François Therond, Neuilly S/Seine, both of France

[73] Assignee: Institut Francais Du Petrole, Rueil Malmaison, France

[21] Appl. No.: 200,732

[22] Filed: May 31, 1988

[30] Foreign Application Priority Data

Jun. 4, 1987 [FR] France ................... 87 07867

[51] Int. Cl.$^4$ ............ G01V 1/40; G01V 1/22; B21B 47/12
[52] U.S. Cl. .................... 367/34; 367/57; 367/60; 340/858; 375/58
[58] Field of Search ........... 367/25, 34, 57, 60; 340/858; 346/33 WL; 375/58, 61

[56] References Cited

U.S. PATENT DOCUMENTS

| | | | |
|---|---|---|---|
| 4,041,443 | 8/1977 | Thigpen | 367/75 |
| 4,122,311 | 10/1978 | Klatt et al. | 178/50 |
| 4,285,052 | 8/1981 | Bobbitt | 367/79 |
| 4,509,170 | 4/1985 | Hollinger et al. | 367/85 |
| 4,808,996 | 2/1989 | Zimmer | 340/858 |

FOREIGN PATENT DOCUMENTS

| | | |
|---|---|---|
| 0137724 | 4/1985 | European Pat. Off. |
| 0198966 | 10/1986 | European Pat. Off. |
| 2517456 | 6/1983 | France . |
| 2613159 | 9/1988 | France . |
| 2616230 | 12/1988 | France . |
| 2067056 | 7/1981 | United Kingdom . |

*Primary Examiner*—Nelson Moskowitz
*Attorney, Agent, or Firm*—Antonelli, Terry & Wands

[57] ABSTRACT

A system is provided for acquiring and recording signals delivered by a set of sensors disposed in one or more probes lowered into a well at the end of a multi-function cable.

The different signals to be transmitted are multiplexed before being applied to an acquisition chain adapted for amplifying them, digitizing them and coding them before applying them to a transmission channel in the form of blocks of digitized words. The multiplexing means may comprise several multiplexing units. The sampling frequency of each signal and the formation of the blocks of words are adapted to the number of units effectively used. In the surface installation, the blocks of words are dissociated and stored in a memory in a single mode suitable for all the blocks whatever their formation.

9 Claims, 6 Drawing Sheets

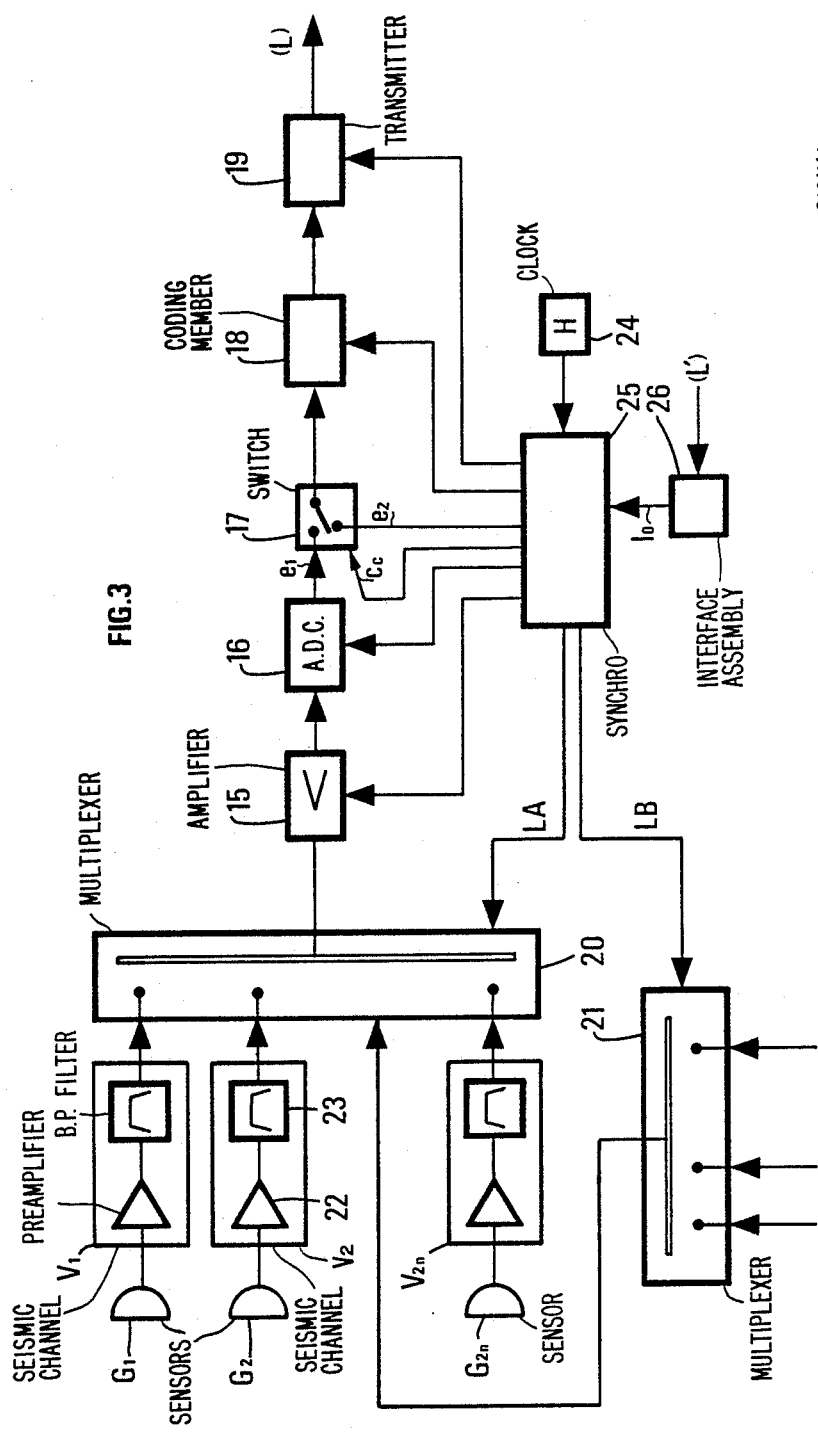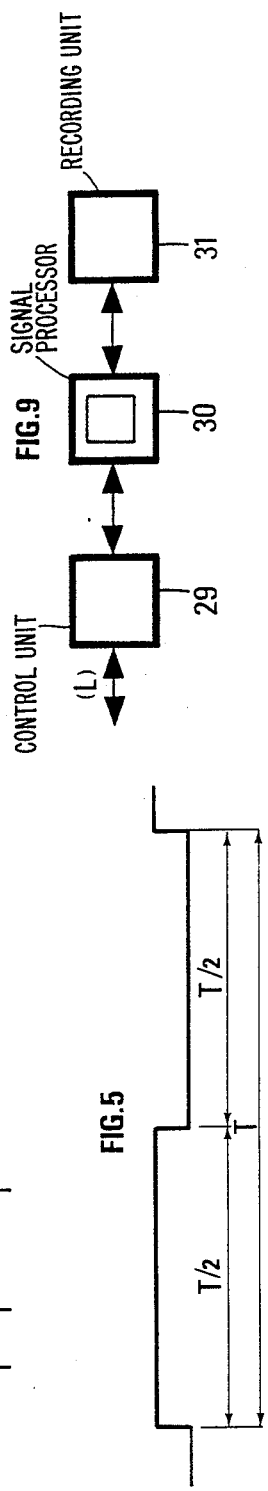

FIG.6
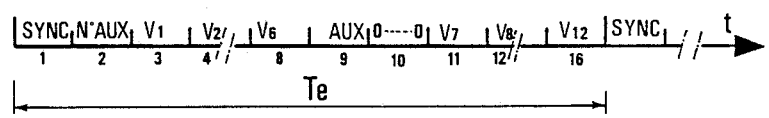
FIG.7
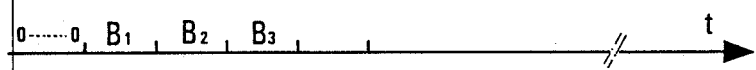
FIG.8A
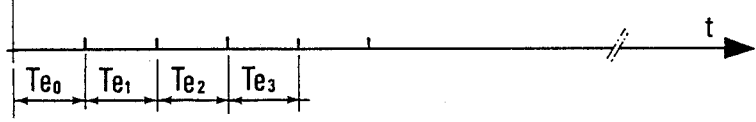
FIG.8B
FIG.8C

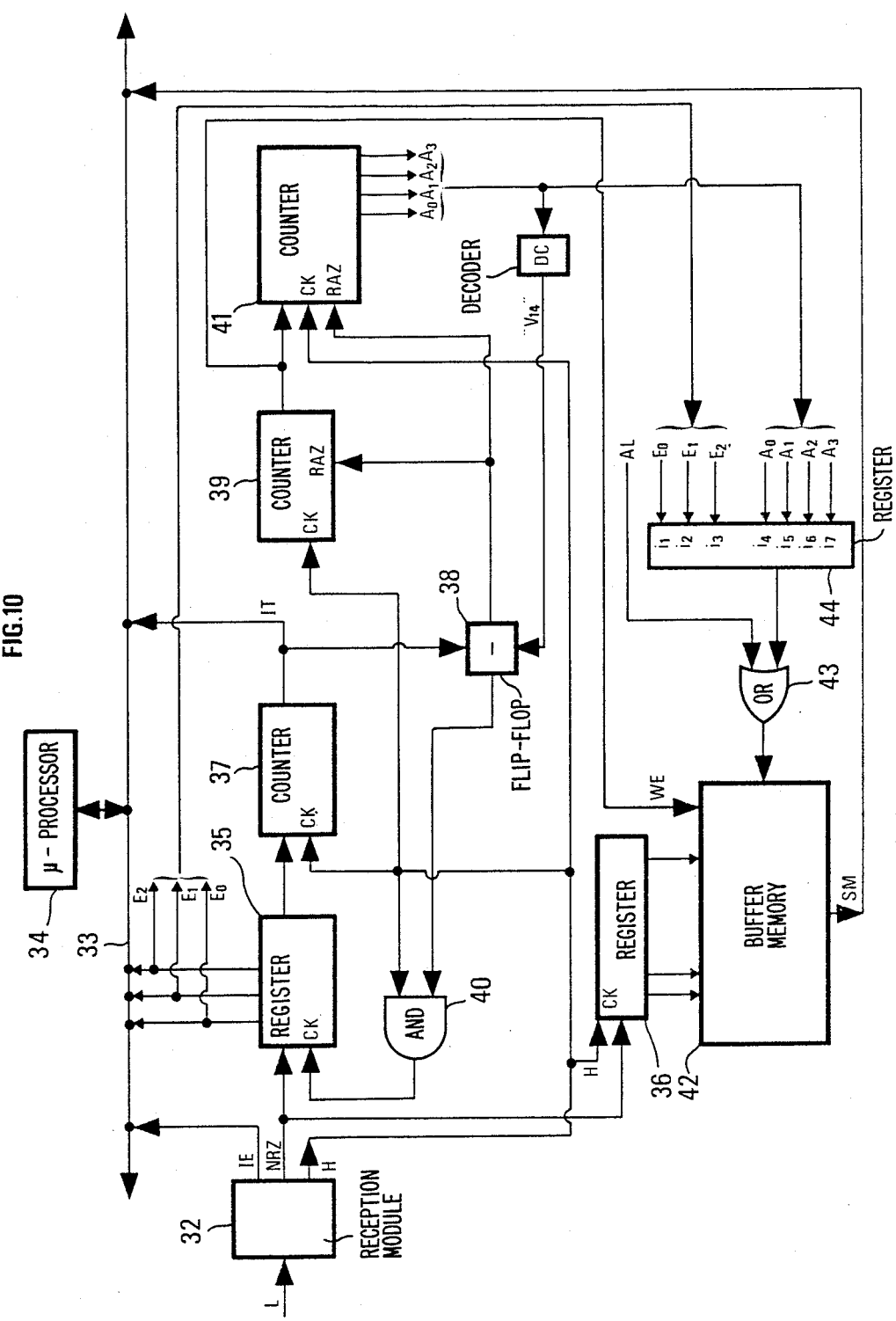

SYSTEM FOR ACQUIRING AND RECORDING SIGNALS DELIVERED BY A SET OF SENSORS DISPOSED IN WELL PROBES

BACKGROUND OF THE INVENTION

1. Field of Invention

The present invention relates to a system for acquiring and recording signals delivered by a set of sensors disposed in one or more probes lowered into a well.

2. Description of the Prior Art

The acquisition of measurement data in a borehole is generally achieved by lowering therein one or more probes suspended from a multi-function cable. The probe comprises an elongated body and one or more mobile arms. Hydraulic jacks cause each arm to move from a rest position against the body of the probe to an opened out position where they anchor themselves against the wall of the borehole and thus immobilize the probe. Hydraulic circuits connect the jacks to means for delivering pressurized fluid generally comprising an electric motor and solenoid valves. The multi-function cable very often comprises a plurality of conducting lines for transmitting electric currents feeding the motor and signals of all kinds. They may for example be control signals transmitted to the probe from a surface installation and response signals sent back from the probe. The response signals are formed either by check or test signals or data measured by the sensors of the probe. Such a probe is described for example in French Pat. No. 2.501.380 or the U.S. Pat. No. 4,428,422.

It is also possible for example to use a probe having anchorage arms actuated by springs which are held tensioned by bolts during lowering Hydraulic means comprising solenoid valves actuated by control signals received through the multi-function cable. Such a probe is described for example in French Pat. No. 2,548,727 or the corresponding U.S. Pat. No. 4,616,703.

The different sensors lowered into the well for making measurements of different kinds may be included in a single probe or else in a set of probes comprising a main probe under which a plurality of satellite probes are suspended at different depths. Such a probe assembly is described for example in French Pat. No. 2.564.599.

Seismic prospection operations are carried out for example by disposing in wells a plurality of sensors adapted for detecting waves reflected back by the discontinuities of the subsoil, coming from a seismic source disposed on the surface or in the vicinity thereof, or else in another well. The signals received are used so as to obtain seismic sections of the subsoil. The seismic sensors are generally directional and oriented in one or more directions orthogonal to each other. They are disposed in an assembly of cell probes so as to pick up the seismic signals received at different depths levels and are connected to a surface recording station either directly by means of a special line included in the multi-function cable or through a seismic acquisition apparatus. In this case, the different signals are connected, sampled, digitized and transmitted over one or more lines of the multi-function cable in coded form. After decoding, they are recorded and processed by a laboratory.

The number of different sensors in a seismic reception device may vary particularly depending on the configuration of the reception assembly used.

In some cases, a single well probe is used having a compartment for one or two three-dimensional sensors comprising for example, three sensitive directional elements whose axes are oriented in three directions orthogonal to each other. In other cases, an assembly of several probes is lowered into the borehole, suspended below each other and each containing at least one sensor. An acquisition apparatus is disposed in the main probe. It is connected to the sensors housed in the different probes. It may be a question of directional sensors or else of three-dimensional sensors. The number of seismic channels to be acquired is therefore very variable and it is important that the acquisition apparatus used may be readily adapted to very different sensor configurations.

SUMMARY OF THE INVENTION

The system of the invention makes possible the acquisition and recording of signals delivered by a set of sensors disposed in one or more probes which are lowered into a well at the end of a multi-function cable having signal transmission lines, and it may be readily adapted to extended sensor assemblies or else to other more restricted assemblies.

It comprises an acquisition assembly disposed in a probe and provided with signal amplification means, analog digital conversion means, means for adapting the signals before their application to at least one line of the multi-function cable and synchronization means, and a control and recording assembly disposed on the surface and connected to the signal transmission lines. It further comprises signal multiplexing assembly formed of at least two parallel multiplexing units each having the same number of input channels, the outputs of the two multiplexing units being interconnected to the input of the acquisition assembly and the input channels of one at least of these two units receiving signals coming from said sensors, control means for enabling a single multiplexing unit at a time so as to select the input channels thereof, and means for controlling the switching of the input channels of the multiplexing assembly at a frequency independent of the number of multiplexing units used, so as to vary the reading frequency of each of the input channels connected to a sensor, as a function of the number of multiplexing units used.

The means for adapting the signals are arranged for example for grouping the digitized data to be transmitted in blocks of digital words preceded by a synchronization word, the number of words in each block depending on the number of multiplexing units and on the number of the input channels of each of them, the assignment of each position in said block depending on the number of input channels effectively connected each to one of said sensors.

A multiplexing assembly is, for example, used having two multiplexers connected to the synchronization means by addressing lines and an enabling line, this latter being connected directly to the enabling input of the first multiplexer and, through a logic inversion element, to that of the second multiplexer. The multiplexing assembly may comprise an auxiliary multiplexer connected to an input channel of one of the multiplexing units, the corresponding input channel of the other multiplexing units not being connected.

The signal adaptation means are adapted then for grouping the digitalized data to be transmitted in blocks of words whose number is equal to the total number of input channels of the multiplexing assembly.

The system of the invention may then be readily adapted depending on the needs, to the transmission of data delivered by a number of sensors with a certain sampling frequency, or, if the number of sensors is small, with a higher sampling frequency.

BRIEF DESCRIPTION OF THE DRAWINGS

Other features and advantages of the system will be clear from reading the description of a particular embodiment given by way of example, with reference to the accompanying drawings in which:

FIG. 3 shows a block diagram of a signal acquisition device housed in the main probe;

FIG. 5 shows a timing diagram of a signal for enabling the multiplexing assembly;

FIG. 6 shows the construction of each digital "word" transmitted;

FIG. 7 shows the construction of a block of words transmitted;

FIG. 8 shows a transmission timing diagram from an initial initialization time;

FIG. 9 shows a general block diagram of a control and recording assembly disposed on the surface;

FIG. 10 is a block diagram of a device for dissociating the blocks of words received and memorizing the component words separately.

DESCRIPTION OF THE PREFERRED EMBODIMENT

Figure 2:
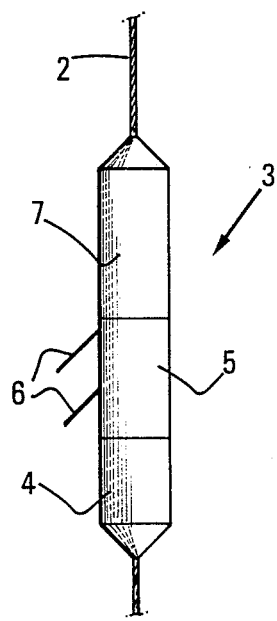
FIG. 2 shows in greater detail the body of a main probe.

The seismic prospection of the subsoil may be carried out by lowering into a borehole 1 at the end of a multifunction electric carrying cable 2, a reception device having a single probe or a set of probes. At the head is disposed a main probe 3 of the type described in the above cited French Pat. No. 2.501.380 which comprises (FIG. 2) a body with several compartments. In a lower compartment one or more seismic sensors are housed. It may be a question of a directional geophone oriented for picking up the longitudinal or transfers waves, or a triaxial geophone adapted for picking up the components of the seismic waves in three orthogonal directions. In a middle compartment 5 is disposed a hydraulic assembly feeding the control jacks for the two mobile arms 6 which are movable between a folded up position against the body and an open position in which they anchor themselves in the wall of the borehole 1 and apply the body of probe 3 against the diametrically opposite wall. In an upper compartment 7 is disposed a data acquisition apparatus which will be described in connection with FIGS. 3 and 4.

After the main probe, are disposed, depending on the needs, one or more satellite probes 8 having at their lower part a compartment 9 for one or more seismic sensors. In the upper part is disposed a control mechanism (not shown) for operating a mobile arm 10 for anchoring the satellite probe against the wall of the well. This mechanism comprises for example a spring and a bolt which may be remote-controlled. Such a satellite probe is described for example in the above mentioned French Pat. Nos. 2.548.727 or 2.564.599.

The multifunction cable connects the probe or the string of probes to a surface installation comprising a support structure 11 with handling winch 12.

The multifunction cable 2 is of a current type and comprises 7 conducting lines ($L_1 \ldots L_7$) and an external metal sheath. Through the cable electric power is transmitted for operating a motor pressurizing the hydraulic liquid required for operating the jacks and intermittent electric currents for opening or closing control solenoid valves. Other lines of cable 2 are used for transmitting control signals and data as will be described hereafter. Cable 2 is connected to a handling winch carried by a vehicle 13 containing a central control and recording system. A seismic source 14 is disposed on the surface and, at the command of the central system, emits seismic waves which are transmitted into the ground. The different signals received by the different sensors lowered into the well are collected by the data acquisition apparatus disposed in the main probe 3 and transmitted to the central system.

The data acquisition apparatus shown schematically in FIG. 3 comprises an acquisition chain including a variable gain amplifier 15 of the type described for example in the published French Pat. Nos. 2.593.004 and 2.592.537. This amplifier delivers signal samples amplified with optimum gain, to an analog-to-digital converter 16. The digitized samples are applied to a first input $e_1$ of an electronic switch 17. The output thereof is connected to the input of a specialized circuit 18 adapted for coding the digital "words" coming from converter 16, in accordance with a bipolar code such as the code HDB-3 well-known by specialists. The coded signals are applied to a transmission element 19 whose output is connected to a line L of the multifunction cable 2.

The device also comprises a multiplexing assembly adapted for sequentially applying to the input of the acquisition chain, 2n signals (n is an integer) delivered by seismic channels $V_1, V_2 \ldots V_{2n}$ as well as complementary signals. This multiplexing assembly comprises for example a main multiplexer 20 with inputs for the 2n seismic channels $V_1$ to $V_{2n}$ and at least one input connected to the output of an auxiliary multiplexer 21. Signals with a relatively slow variation such, for example, as signals indicating the temperature prevailing in the body of the main probe 3 or opening of the different anchorage arms 6, 10, etc. are applied to the different inputs of the auxiliary multiplexer 21.

Each of the 2n seismic channels $V_1$, $V_2$, $V_{2n}$ comprises a fixed gain preamplifier 22 connected to a seismic sensor $G_1$, $G_2 \ldots G_{2n}$. The amplified signals from the preamplifiers 22 pass respectively through band pass filtering assemblies 23 before being applied to the inputs of the main multiplexer 20.

A clock signal H generated by an oscillator 24 is applied to a logic synchronization assembly 25 which produces signal sequences including:

signals for controlling the main multiplexer 20 and the auxiliary multiplexer 21, applied respectively through assemblies of lines LA, LB;

an initialization signal applied to a second input $e_2$ of switch 17;

a signal for controlling switch 17 applied to an input Cc thereof for connecting to the input of coding circuit 18, either its input $e_1$, or its input $e_2$; and signals for synchronizing different elements 15, 16, 18 and 19 of the seismic acquisition chain.

An interface assembly 26 receives over a line L' of the multi-function cable 2 signals for synchronizing the data acquisition cycles.

By way of example, the number n is chosen equal to 6.

That allows the acquisition of 12 separate seismic signals. A reception device may for example correspond to this number comprising 4 probes each having a triaxial geophone or possibly 12 probes each containing a monodirectional sensor, with the possibility of intermediate configurations in which each probe comprises two directional sensors.

The sampling period of each of the signals depends on the number of channels of the multiplexer and on the maximum data flow which may be conveyed over the lines of the transmission cable 2. If the number of sensors is more limited, which occurs for some seismic applications for example in which only half the channels are used, and if the structure of the multiplexer is fixed, the transmission possibilities will be under-employed, a part of the multiplexing period being devoted to reading unconnected channels.

The device of the invention comprises a multiplexing assembly which may be very readily limited to the interrogation of a more restricted number and which on the other hand offers a shorter sampling period, using a simplified control structure.

Figure 4:
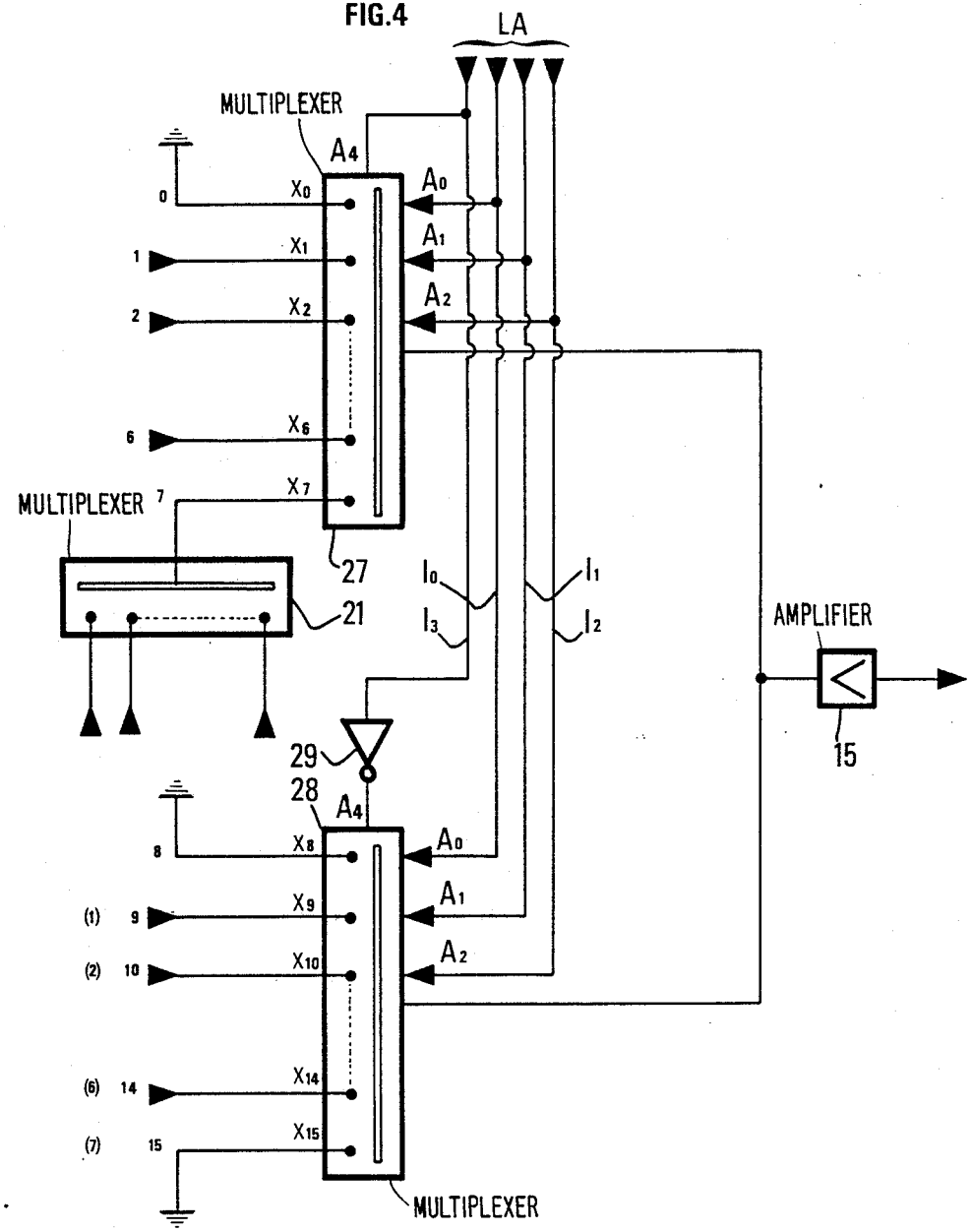
FIG. 4 shows in greater detail the assembly for multiplexing the different signals to be transmitted to the surface installation, used in the acquisition device.

The assembly 20 comprises two multiplexing units 27, 28 (FIG. 4) each offering (n+2) input channels, n representing half the total number of seismic channels required. In the diagram of FIG. 4, n has been chosen equal to 6. The inputs of unit 27 are designated by $X_0$, $X_1 \ldots X_7$ and those of unit 28 by $X_8, X_9 \ldots X_{15}$. The input $X_0$ is grounded. Switching of unit 22 to this channel makes it possible if required to make automatic zero corrections during the step for digitizing the samples. The inputs $X_1$ to $X_6$ are connected to the seismic channels $V_1$ to $V_6$ (FIG. 3). The input $x_7$ is connected for example to the output of the auxiliary multiplexer 21. The inputs $X_8$ and $X_{15}$ of unit 28 are connected to ground or remain unconnected. The inputs $X_9, X_{10} \ldots X_{14}$ are connected to the same seismic channels $V_7$ to $V_{12}$. The respective outputs of the two multiplexing units 27, 28 are interconnected to the input of amplifier 15.

Each unit 27, 28 comprises three inputs $A_0, A_1, A_2$ for applying channel selection signals and an enabling input $A_4$. The assembly of lines $L_A$ connecting the logic synchronization assembly 25 (FIG. 4) to the main multiplexer 20 comprises three addressing lines $L_0, L_1, L_2$ connected respectively to the inputs $A_0, A_1, A_2$ of the two units 27, 28 and a line $l_3$ connected to the input $A_4$ of the unit 27. The corresponding input of unit 28 is connected to this same line $l_3$ through a logic inverter circuit (or inverter) 29.

The acquisition device operates in the following way:

If a reception assembly comprising twelve sensors, in which configuration the suitable multiplexing period is $T_e$, is lowered into a well, the synchronization assembly 25 is controlled so that it applies during each acquisition cycle onto line $L_4$ an alternately high and low signal (FIG. 5), that is to say of respective logic values 1 and 0. Because of the inverter 29, the control signals applied to the two multiplexing units 27, 28 are complementary. When unit 27 is enabled, the other 28 is inhibited and reciprocally. During the first half-period $T_e/2$, the control signals applied to the addressing lines $L_0, L_1, L_2$ connect successively the inputs $X_O$, to $X_7$. During the other half-period $T_e/2$, it is the inputs $X_8$, to $X_{15}$ of the other unit 28 which are connected successively.

The application of the alternating signal to line $l_3$ makes possible scanning of the whole of the input of the main multiplexer 20.

If, for the seismic prospection operations to be carried out, only six sensors at most are used, connected to the inputs $X_1$ to $X_6$ of the multiplexing unit 27, the synchronization assembly 25 is controlled so that it permanently applies to line $l_3$ a high level logic signal so as to permanently inhibit unit 28. Since the time for exploring the six channels $V_1$ to $V_6$ is shorter in this case, the sampling frequency of the seismic signals may be multiplied by 2. Each signal sample is digitized in the form of a word of 16 bits, comprising (FIG. 6) 11 mantissa bits, a sign bit and 4 bits $g_1, g_2, g_3, g_4$ for the amplification gain. The configuration of these 4 bits never reaches the value 15: it is voluntarily limited to 11 or 13.

The digital words corresponding to the same multiplexing cycle are assembled in blocks of 16. The first word of each block (SYNC.) is used for synchronizing the transmission The second defines the number of the auxiliary channel (No. AUX) which will be interrogated during the cycle in progress. The words 3 to 8 correspond to the samples taken successively from channels $V_1$ to $V_6$. The 9th word corresponds to the signal sample (AUX) read from the auxiliary channel designated (No. AUX). The next as a standard separation word formed entirely of zeros for example. The following six words 11 to 16 correspond to the samples $V_7$ to $V_{12}$ taken from channels $V_7$ to $V_{12}$ of the second multiplexing unit 28.

In the case where the number of sensors used is at most equal to six and where the sampling time of the seismic channels is reduced by half, channels $V_7$ to $V_{12}$ are replaced by channels $V_1$ to $V_6$. The same block of 16 words comprises then two samples of each of the channels during the same sampling period $T_e$.

To initiate a seismic data acquisition cycle, the control and recording system on the surface sends an order over line L' of the multi-function cable 2. On reception of this order (5A, FIG. 8A) transmitted through the interface assembly 26 (FIG. 3), the synchronization assembly 25 generates a predetermined sequence:

it applies to the input Cc of switch 17 (FIG. 3) a switching signal for connecting the input $e_2$ to the input of the coding circuit 18;

over the sets of lines $L_A, L_B$, it transmits control signals for the main multiplexer 20 and auxiliary multiplexer 21 which select a given channel (by way of example, lines $l_0, l_1, l_2, l_3$, (FIG. 4) are placed at the low logic level so as to select first of all the input channel $x_0$); and it applies to the input $e_2$ of the switch, a low logic level signal, so that the coding circuit generates in coded form a succession of zeros during the whole duration of the first multiplexing period $T_{e0}$ (FIGS. 8B, 8C). This succession of zeros defines the initialization period.

At the end of this initial period when the multiplexers 21 and 27 have been switched to their first respective channels, the synchronization assembly 25 again actuates switch 17 so that the input $e_1$ is again connected to the coding circuit 18. The sample blocks $B_1, B_2 \ldots$ digitized by the A-D convertor 16 during the following sampling periods $T_1, T_2 \ldots$ (FIGS. 8B, 8C) are then transmitted to the surface control system over line L.

Figure 1:
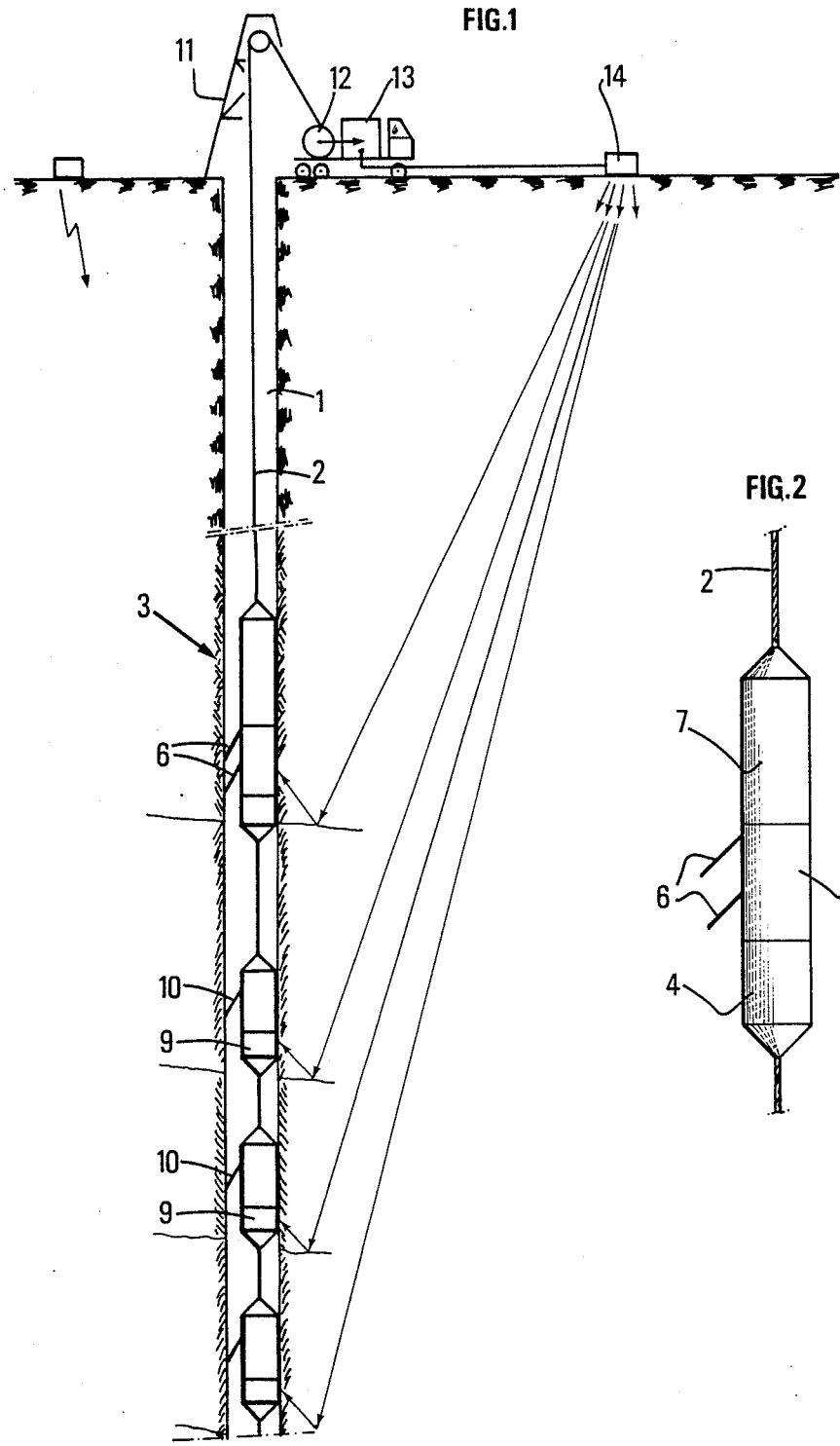
FIG. 1 shows a string of probes anchored in a well and connected to a surface installation.

The surface control and recording system, at the other end of the transmission cable 2 (FIG. 1), comprises (FIG. 9) a control unit 29, a signal processing unit 30, for controlling and displaying the different functional sequences and a seismic data recording unit 31. The control unit 29 comprises supply and control means which allow an operator to control the anchorage of the arms of the main probe, the tripping of those of the satellite probes and the display of the electric supply voltages and hydraulic pressures. Such a control unit is described in the French patent application EN. 87/04.677.

The line L is connected directly, through the control unit 29, to the signal processing unit 30. The signals sent up over this line L are applied (FIG. 10) to a reception decoding module 32 which extracts two different signals therefrom. The first one corresponds to the data transmitted from the well probe which are presented in the so-called NRZ code and the second, to the clock signal H which time the transmission of the signals Module 32 also delivers an interruption signal IE if it detects an error in the transmission of the signals received and applies it through connecting conductor assembly 33 which is generally designated by bus, to a microprocessor 34 adapted for controlling the recording procedure.

The NRZ code coded signals are applied in series to the input of two 16-bit shift registers 35, 36. The "overflow" output of register 35 is connected to the counting input of a 4-bit counter 37. The "carry" output thereof is connected to bus 33 and to a first input of a flip-flop 38. The output of the flip-flop 38 is connected to the input of the ANO gate 40 whose output is connected to the "clock" input CK of the shift register 35 and to the respective reset inputs RAZ of a second 4-bit counter 39 (bit counter) and a third counter 41 (channel counter). Thus a signal of logic level 0 closes the AND gate 40 and releases the counters 39 and 41.

The "carry" output of counter 39 is connected to the counting input of the channel counter 41. The 16 parallel outputs of the shift register 36 are connected to the inputs of a tuffer memory 42 The parallel outputs of an address register 44 are connected to the addressing inputs of memory 42 through an OR gate 43. The three "least significant" bits of the shift register 35 ($E_0$, $E_1$, $E_2$) (corresponding to the three least significant bits of the binary words) are connected to the bus 33 and respectively to the three inputs $i_1$, $i_2$, $i_3$ of the address register 44. Four other inputs thereof ($i_4$, $i_5$, $i_6$, $i_7$) are connected respectively to the parallel outputs $A_0$, $A_1$, $A_2$, $A_3$ of the channel counter 41. The clock signal H from decoder 32 is applied to the "clock" input CK of the three counters 37, 39, 41, to that of the shift register 36 and finally to the input of the AND gate 40. The 4 outputs $A_0$, $A_1$, $A_2$, $A_3$ of the same channel counter are connected to the inputs of a decoder DC which upon detection of the number 14 expressed in binary figures, is adapted for emitting a pulse which is applied to a second input of flip-flop 38. The outputs SM of the buffer memory 42 are connected to the bus 33.

To the second input of the OR gate 43, the microprocessor 34 may apply words defining addresses of the buffer-memory 42 and control the readout of the data contained in these addresses over bus 33 and transfer thereof via this bus 33 to the recording unit 31 (FIG. 9). Finally, the write enabling order WE in the buffer memory 42 is taken at the "carry" output of the bit counter 39.

Figure 11:
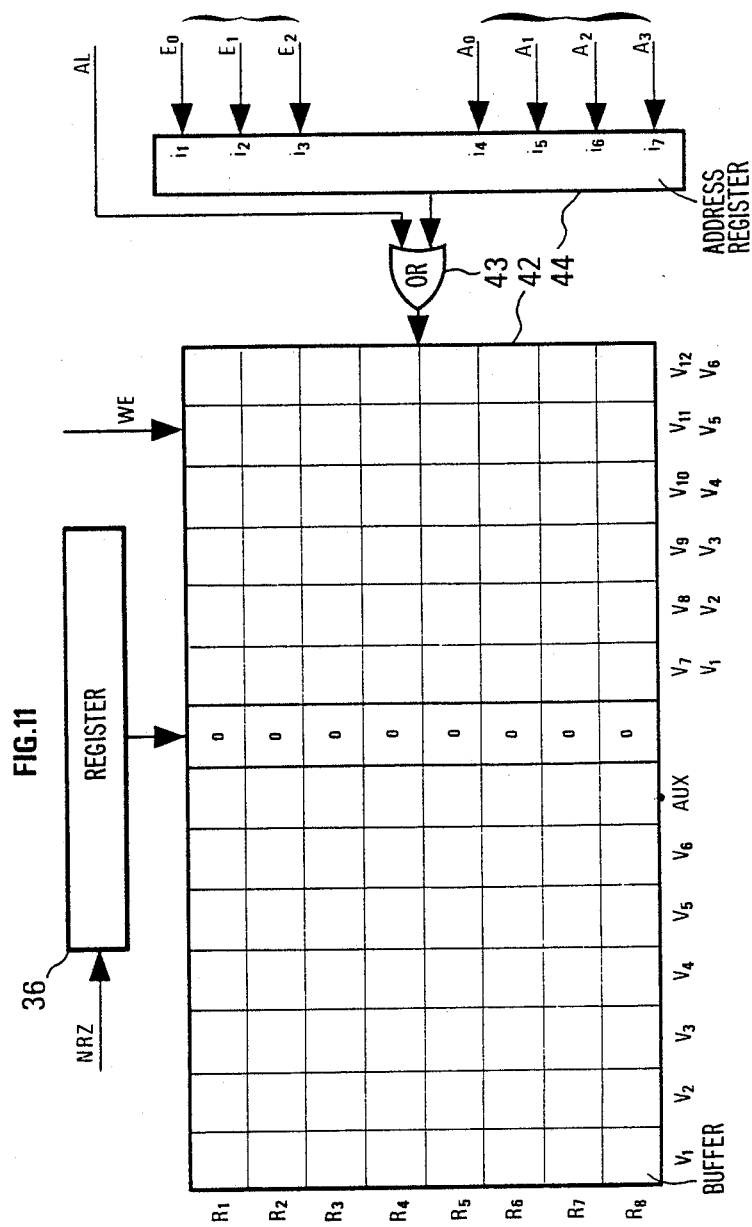
FIG. 11 shows in table form the organization of a buffer memory in the block disassociation device.

The buffer-memory 42 is organized for example in the form of an 8-line and 14-column table (FIG. 11). The bits at the output $E_0$, $E_1$, $E_2$ of the shift register 35 (FIG. 10), applied to the inputs $i_1$, $i_2$, $i_3$ of the address register 44, define the line number of the memory.

The bits $A_0$–$A_3$ read out from the output to the channel counter 41 and applied to the inputs $i_4$–$i_7$ of the same address register 44 define the column number.

The contents of the shift register 36 are transferred to the address designated by the line number and the column number, on reception of each of the successive enabling orders WE coming from the bit counter 39.

Each line may contain 14 words of 16 bits, that is to say all the samples read during the same acquisition cycle $T_e$ (FIG. 7). The first six positions in each line are assigned respectively to the channels $V_1$ to $V_6$. The seventh is assigned to the sample read out from an auxiliary channel. The next position is loaded with the number zero. In the six following positions, finally, are stored the samples corresponding respectively to the channels $V_7$ to $V_{12}$.

The storage of the samples takes place in the following way:

The first word of each block (FIG. 7) is signaled by a synchronization word comprising sixteen logic "1"s followed by a single logic "0". This word passes through the two parallel shift registers 35, 36 at the timing fixed by the clock H and its sixteen "1"s are accumulated in the four bit counter 35. When this latter emits a "carry" pulse, the next word, namely the one which indicates the number of the interrogated auxiliary channel, is completely in the shift register 35. This "carry" pulse, by actuating flip-flop 38, results in closing the AND gate 40 and thus freezing in the shift register 35 the number of the auxiliary channel and thus frees the bit counter 39 and the channel counter 41. The three least significant bits $E_0$, $E_1$, $E_2$ which represent this number will define the number of the row in the buffer-memory 42 where the samples of the block received must be all memorized. This "carry" pulse forms an interruption signal IT for the microprocessor which then interrogates the 3 bits $E_0$, $E_1$, $E_2$ of register 35 for determining the number of the auxiliary channel of the block. The flip-flop 38, at the same time as it closes gate 40, will release the counters 39 and 41. Each "carry" pulse emitted by the counter 39 every sixteen clock pulses H, marks the separation between the successive 16-bit words of the block. It is used as an enabling order for the buffer memory for loading the word then present in the second shift register 36. Since this "carry" pulse causes the contents of the channel counter 41 to progress by a unit so the number of the column of the address register 44, the word present in the shift register 36 is stored in the next position in the same row.

The detection by decoder DC of the number 14 at the parallel outputs of the channel counter 41 causes tripping of flip-flop 38 and so, consequently, resetting of counter 41 until a new synchronization word formed of sixteen logic "1"s is detected.

The clock signal again has access to the first shift register 35. The reception of the next block of words may then begin.

Each row $R_1$ to $R_8$ contains 14 words and filling thereof lasts for a time interval $T_e$ but its contents is different depending on whether the twelve channel option or the twice six channel option has been chosen. In the first case, the words of a same row correspond to the twelve different channels In the second case, the positions nine to fourteen in the same row are again assigned to channels V1 to V6.

The memorization assembly operates them in the same way in both cases.

The real assignment of the positions is known only by the microprocessor alone 34 which receives instructions consequently. When it reads one or more rows of the buffer memory 42 during the time intervals between two successive writing operations, for transferring the words which it contains to the recording assembly 31 (FIG. 9), it applies successively the addresses of the different positions to be read out to the second input of the OR gate 43.

In the second case when the reception assembly only comprises six seismic channels interrogated with a period $T_e/2$, the microprocessor is programmed so that, on the demultiplexed seismic recordings, the samples read out at positions 1 and 9 of each row are disposed side by side because they relate to the same seismic channel.

In both cases, the auxiliary multiplexer 21 (FIG. 4) is interrogated with the same timing $T_e$, each change of the value of the triplet $E_0$, $E_1$, $E_2$ read out from the first shift register 45 indicating the passage from one block of 16 words to the next.

Without departing from the scope of the invention, a multiplexing assembly can be used having more than two parallel multiplexers and grouping the digitized data in blocks of words, the words being disposed in each block at positions such that deactivation of one or more multiplexers makes it possible, with a constant interrogation period $T_e$, to increase the interrogation frequency of the effectively connected channels. The buffer-memory is then arranged for storing in the same line of the table (FIG. 11) all the signal samples collected during the same interrogation period.

What is claimed is:

1. System for acquiring and recording signals delivered by a set of sensors disposed in one or more probes which are lowered into a well at the end of a multi-function cable provided with signal transmission lines, comprising an acquisition assembly disposed in a probe and having signal amplification means, analog-to-digital conversion means, means for adapting the signals before they are applied to at least one line of the multi-function cable and synchronization means, and a control and recording assembly disposed on the surface and connected to the signal transmission lines, which system further, comprises a signal multiplexing assembly formed of at least two parallel multiplexing units each having the same number of input channels, the outputs of the two multiplexing units being interconnected to the input of the acquisition assembly and the input channels of one at least of these two units receiving the signals coming from said sensors, control means for enabling a single multiplexing unit at a time so as to select the input channels thereof and means for controlling the switching of the input channels of the multiplexing assembly at a frequency independent of the number of multiplexing units used, so as to cause the readout frequency of each of the input channels connected to a sensor to vary as a function of the number of multiplexing units used.

2. The system as claimed in claim 1, wherein the multiplexing assembly comprises two multiplexers connected to the synchronization means by addressing lines and an enabling line, this latter being connected directly to the enabling input of the first multiplexer and through a logic inversion element to that of the second multiplexer.

3. The system as claimed in claim 1, wherein the means for adapting the signals are adapted for grouping the digitized data to be transmitted in blocks of digital words preceded by a synchronization word, the number of words in each block depending on the number of multiplexing units and on the number of input channels of each of them, the assignment to each position in the said blocks depending on the number of input channels effectively connected each one to one of said sensors.

4. The system as claimed in claim 1, wherein the multiplexing assembly comprises an auxiliary multiplexer connected to an input channel of one of the multiplexing units, the corresponding input channel of the other multiplexing units not being connected, and the signal adaptation means are adapted for grouping the digitized data to be transmitted in blocks of words whose number is equal to the total number of input channels of the multiplexing assembly.

5. The system as claimed in claims 1 or 3, wherein the control and recording assembly includes a buffer memory and means for grouping together in said buffer memory all the digital words belonging to the same block of digital words transmitted.

6. The system as claimed in claims 1 or 4, wherein the control and recording assembly comprises a buffer-memory associated with an address register and a means for grouping together in the buffer memory all the digital words belonging to the same block, said means comprising a first counter for detecting each synchronization word, a first and a second shift register receiving in parallel the digitized signal, means for disabling the first register, on detection in each block of words of that one which represents the order number of the channel of the auxiliary multiplexer, means for controlling the address register for regrouping together in the buffer memory all the digital words belonging the same block corresponding to this same order number and counters for controlling the distribution of the different words of the same block to the different positions of the same address block.

7. The system as claimed in claim 6, comprising a channel counter, the parallel outputs of said channel counter and the outputs of the first shift register being connected to the addressing inputs of the address register.

8. The system as claimed in claim 6, wherein the control and recording assembly also comprises recording means, a programmable computer adapted for controlling the transfers of the contents of the address blocks of the buffer memory to the recording means, at positions depending on the number of multiplexing units effectively used.

9. The system as claimed in claim 1, comprising a switch for selectively connecting to the input or the adaptation means the outputs of the analog-to-digital conversion means, or else an output of the synchronization means, the control and recording assembly being adapted for ordering the synchronization means to apply to said adaptation means through said switch a predetermined digital word during an initialization time interval, at the beginning of each transmission cycle.

* * * * *